United States Patent [19]

Mizuno et al.

[11] 4,328,587

[45] May 4, 1982

[54] PHASE SLIP DETECTOR AND SYSTEMS EMPLOYING THE DETECTOR

[75] Inventors: Toshio Mizuno, Tanashi; Takuro Muratani, Yokohama, both of Japan

[73] Assignee: Kokusai Denshin Denwa Kabushiki Kaisha, Tokyo, Japan

[21] Appl. No.: 115,534

[22] Filed: Jan. 25, 1980

[30] Foreign Application Priority Data

Feb. 19, 1979 [JP] Japan .................................. 54-17290
Feb. 19, 1979 [JP] Japan .................................. 54-17291

[51] Int. Cl.³ .............................................. H03L 7/02
[52] U.S. Cl. ....................................... 375/97; 375/83; 375/80; 329/112
[58] Field of Search .................... 329/2, 103, 110, 118, 329/112, 137; 375/8, 9, 79, 80, 94, 99, 111, 118, 119, 97, 83; 455/205, 206, 296, 305, 312, 337

[56] References Cited

U.S. PATENT DOCUMENTS

| | | | |
|---|---|---|---|
| 3,206,681 | 9/1965 | Brown | 375/94 |
| 3,351,864 | 11/1967 | Scribner | 375/94 |
| 3,353,102 | 11/1967 | Meyers | 375/99 |
| 3,374,435 | 3/1968 | Engel | 375/94 |
| 3,465,253 | 9/1969 | Rittenbach | 455/337 |
| 3,593,140 | 7/1971 | Kaneko | 375/118 |
| 3,683,278 | 8/1972 | Ohnsorge | 375/99 |
| 3,777,066 | 12/1973 | Nicholas | 375/118 |
| 3,878,527 | 4/1975 | Rensin | 375/118 |
| 3,921,076 | 11/1975 | Currie | 375/95 |
| 4,096,442 | 6/1978 | McRae | 329/112 |

*Primary Examiner*—Benedict V. Safourek
*Assistant Examiner*—Stephen Chin
*Attorney, Agent, or Firm*—Pollock, Vande Sande & Priddy

[57] ABSTRACT

A phase slip detector and systems employing said detector comprises a frequency detector for detecting an instantaneous value of received carrier frequency and an integrator for integrating the output of said detector, and determines an occurrence of phase slip by detecting the output level of the integrator larger than predetermind threshold level. Application of the phase slip detector to a carrier recovery system makes it possible to obtain a correct recovered carrier without the effect of phase slip, and application of the detector to a demodulated data compensation system makes it possible to obtain received or demodulated data compressed in generation of burst error and free from the effect of the phase slip.

3 Claims, 7 Drawing Figures

PHASE SLIP DETECTOR AND SYSTEMS EMPLOYING THE DETECTOR

FIELD OF THE INVENTION

This invention relates to a phase slip detector and its applications, and more particularly to a carrier recovery circuit that can recover a correct carrier component with no effect of phase slip that may be encountered in recovering the carrier in digital phase modulation systems.

This invention further relates to a demodulated data compensation system which utilizes said phase slip detection means to eliminate the effect of phase slip that may be found in the demodulated data signal, and to compress generation of burst error in digital phase modulation systems.

DESCRIPTION OF THE PRIOR ART

Recently, data and facsimile communications have become popular, and digital phase modulation systems are extensively used for microwave lines on the surface of the ground and for satellite communication lines as a transmission means of data signals.

To obtain correct data signal by detecting the digital phase modulated wave, it is indispensable to recover a correct carrier component (synchronization signal) from the received digital phase modulated wave. The circuit for this purpose is generally called a carrier recovery circuit, and the carrier wave recovered by the circuit is called a recovered carrier.

Since the recovered carrier has an ambiguity in phase, the apparatus at the receiving side won't be able to know the absolute phase reference at the transmission side. Therefore, the digital phase modulation systems used at present include some means for removing the phase ambiguity.

Among them, a differential coded coherent PSK system is most widely used, where the transmission data differentially encoded in advance is reversely converted at the receiving side. Though this system has the disadvantage that the bit error of the received data is the double of an absolute coded coherent PSK system which is described hereinafter, it has advantage that the phase ambiguity can be removed easily.

The absolute coded coherent PSK system in which the data is demodulated on the basis of the detected absolute phase reference from the transmission side is implemented in various fields from the standpoint of the error correction code. The main reason is that said differential coded coherent PSK system has a peculiar burst error in which two errors appear in combination in addition to a large bit error so that it needs a complicated error correction code, whereas the absolute coded coherent PSK system, having a random error pattern, permits extensive use of random error correction code.

In the absolute coded coherent PSK system, the absolute phase reference is commonly obtained by inserting a known pattern into the transmission data sequence. The ambiguity of phase is removed by inserting periodic carrier information in case of continuous mode and by detecting the polarity of a unique word or words involved in the preamble in case of burst mode such as a TDMA (Time Division Multiple Access) system. Furthermore, in case an error correction code is employed, it is known that the polarity of the decoded syndrome pattern is used to eliminate the phase ambiguity.

Thus, the absolute coded coherent PSK system is superior to the differential coded coherent PSK system because it is easy to apply error correction codes, though it is indispensable to set up a correct absolute phase reference at the receiving side when the former system is employed.

When a digital phase modulated wave is received through a communication path, noises generated at the communication path are superposed thereon, and the noise components cause phase jitter and phase slip in the recovered carrier through the process which will be described hereinafter. When the received digital phase modulated wave is demodulated with respect to the reference that is the regenerated carrier including such phase jitter and phase slip, the phase jitter causes a random error in the demodulated data of differential and/or absolute coded coherent waves, on the other hand, the phase slip causes the following error in accordance with the modulation system.

That is, in the differential coded coherent PSK wave, the demodulated data include burst error only during the period of phase slip occurrence, while in the absolute coded coherent PSK wave, all the demodulated data include burst error during the period from phase slip occurrence to the recovery of the correct absolute phase, or until correct absolute phase information is obtained, wherefore the data loss (or error) due to the phase slip will be extremely large.

Thus, phase slip affects very much the absolute coded coherent PSK wave. Nevertheless, there has been no effective countermeasure except for shortening the transmission interval of the carrier phase information with the sacrifice of information transmission rate. Furthermore, the differential coded coherent PSK system also entails burst error during the period for the occurrence of phase slip, and when it is applied to a data transmission, said burst error clearly gives serious trouble. The signal V(t) containing noise superposed over the carrier is given by the following equation:

$$V(t) = A \cos \omega t + n(t) \tag{1}$$

where A is an amplitude of the carrier, $\omega$ is an angular frequency and n(t) is a noise component.

FIG. 1 shows the effect given by the noise component n(t) to the amplitude and the phase of the carrier. In the figure, four representative phenomena (i)–(iv) are indicated due to variations of noise components n(t): column ($\alpha$) shows vector diagrams of V(t) and column ($\beta$) shows instantaneous values of phase $\theta(t)$ of V(t) for respective phenomena. Furthermore, column ($\gamma$) shows differential waveforms of instantaneous values of phases of V(t) and column ($\delta$) shows integrated waveforms of said differentiated waveforms for the respective phenomena.

Among the variations of noise components n(t), the following representative phenomena are indicated in (i) to (iv) of FIG. 1.

(i) This is the case where the noise component $|n(t)|$ is smaller than the carrier wave component A, and the phase variation $\theta(t)$ is a random variation giving a phase jitter as shown in column ($\beta$).

(ii) This is the case where the noise component $|n(t)|$ is larger than the carrier component A, and the composite vector rotates around the origin 0. The phase variation θ(t) advances by 2π as shown in column (β), providing phase slip.

(iii) This is the case where the noise component |n(t)| momentarily becomes larger than the carrier component A but the composite vector does not surround the origin 0. The phase variation of column (β) takes place but it does not cause phase slip. This phenomenon is also a sort of phase jitter.

(iv) This is the case where the noise component |n(t)| temporarily becomes larger than the carrier component A, but the composite vector approaches in the vicinity of the origin 0, and then returns to the carrier wave vector, giving a phase variation shown in column (β), but causing no phase slip. It is a sort of phase jitter, too.

SUMMARY OF THE INVENTION

Accordingly, a first purpose of this invention is to provide a phase slip detector capable of discriminating the phenomenon of (ii) from the other phenomena (i), (iii) and (iv) in FIG. 1, and of performing correct detection of generated phase slip.

Another purpose of this invention is to provide a carrier recovery circuit that can correctly detect phase slip and shift the phase of the regenerated carrier component by a predetermined amount depending upon the detected output to regenerate the recovered carrier with correct phase.

Still further purpose of this invention is to provide a demodulated data compensation system that can discriminate the phenomenon of (ii) of FIG. 1 from the other phenomena (i), (iii) and (iv) of FIG. 1 to get a correct detection of generated phase slip, and control the polarity of the demodulated data signal according to the detected output, thus eliminating the burst error from the demodulated data signal.

DETAILED DESCRIPTION OF THE INVENTION

Figure 1:
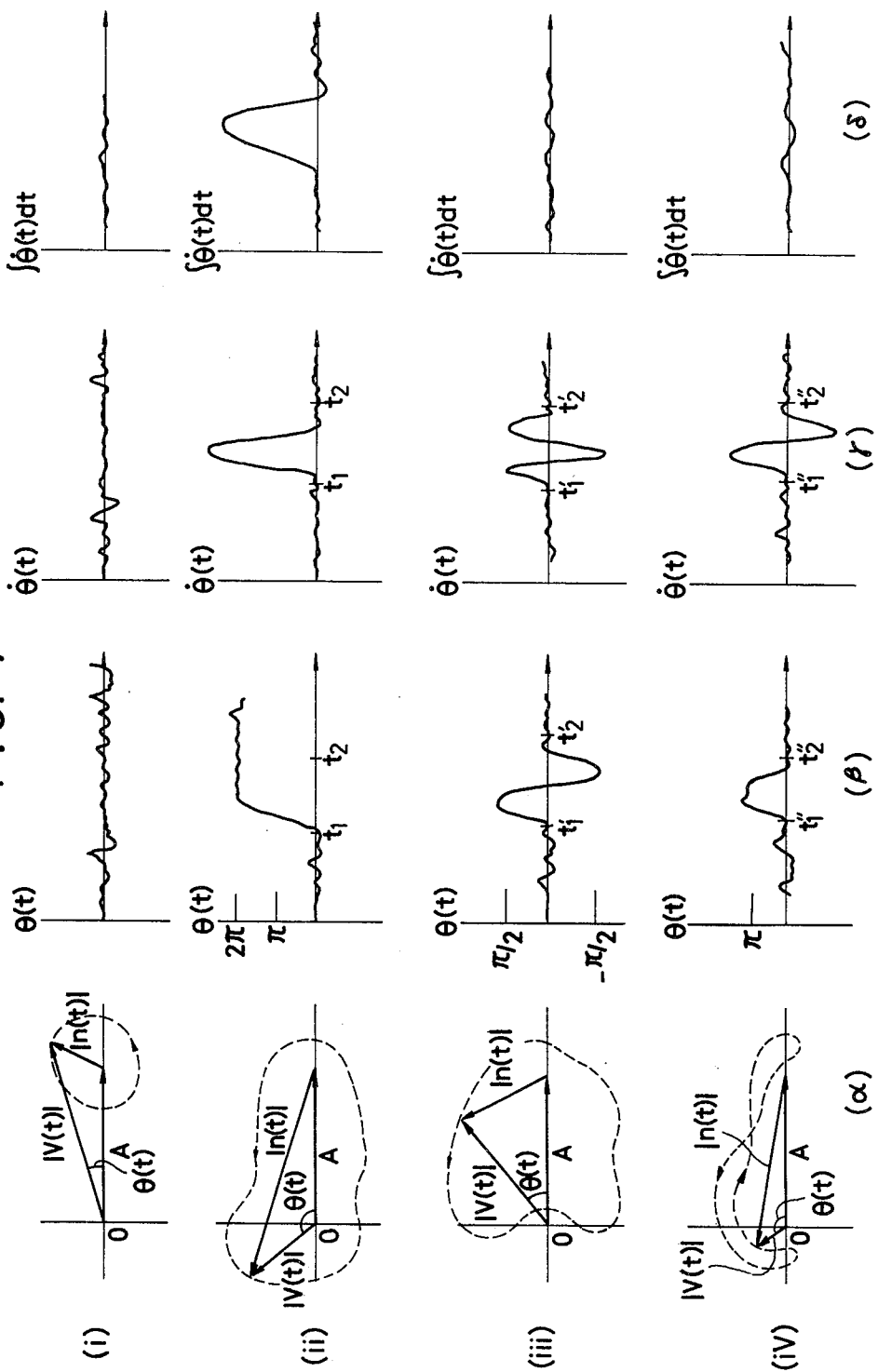
FIG. 1 is a drawing illustrating variations of carrier waves including noise.

It will be easily understood by reference to columns (γ) and (δ) of FIG. 1 that the differentially detected instantaneous value of phase of signal V(t) may be integrated to acheive said first purpose of this invention.

In relation to FIG. 1 (ii), the previous explanation was made on the assumption that the composite vector V(t) rotated counterclockwise and advanced by 2π in phase due to the variation of noise component n(t), but when the composite vector is rotated clockwise it is obvious that the phase is delayed by 2π and the differentiated waveform and its integrated waveform are detected as pulses of negative polarity.

Figure 2:
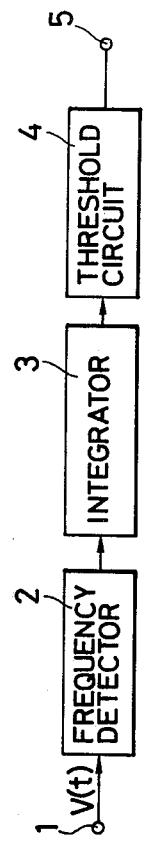
FIGS. 2 through 5 are block diagrams of embodiments of this invention, respectively.

Next, a description will be given of a first embodiment of this invention, referring to FIG. 2. In the figure, numeral symbol 1 denotes an input terminal to which a composite vector signal V(t), of the type shown in column (α) having the phase variation shown in column (β) of FIG. 1, is applied. Block 2 is a frequency detector which detects an instantaneous value of the frequency of input signal V(t) to obtain a differentiated waveform of phase of the type indicated in column (γ) of FIG. 1. All sorts of frequency detectors including, for example, a composite type detector consisting of an envelope detector and a differentiator, are available for use as the frequency detector 2 described hereinbefore. Block 3 is an integrator which integrates the output of said frequency detector 2 and gives only the waveform corresponding to the phase slip shown in FIG. 1 (ii) out of the waveforms shown in column (γ) of FIG. 1, and may be composed of a low pass filter.

The reason why the pulse component θ(t) does not appear at the output of the integrator (low pass filter) 3 in the phenomena of FIG. 1 (iii) and (iv) is that following formulas are in existence.

In the case of (iii):

$$\int_{t_1'}^{t_2'} \frac{d}{dt} \Theta(t) dt = [\Theta(t)]_{t_1'}^{t_2'} \doteq 0$$

In the case of (iv):

$$\int_{t_1''}^{t_2''} \frac{d}{dt} \Theta(t) dt = [\Theta(t)]_{t_1''}^{t_2''} \doteq 0$$

As is described above, it is apparent that the frequency detector 2 in combination with the low pass filter (integrator) 3 can discriminatively detect the presence of any phase slips of the carrier due to the noise in the signal V(t) consisting of carrier and noise.

Furthermore, in this embodiment, a threshold circuit 4 is provided to determine whether the phase slip is positive (advanced by 2π) or negative (delayed by 2π) according to the pulse polarity of the output of the low pass filter 3, and to shape the pulse waveform at the output terminal 5.

As is described above, the system of this embodiment utilizes a simple construction to obtain a correct and effective detection of phase slip caused by noises. Therefore, the system of this embodiment may be extensively applied to a communication system which is seriously influenced by the phase slip.

Next, a second embodiment of this invention will be explained with reference to FIG. 3. In this embodiment, comprising a carrier recovery system, a phase slip detector of the first embodiment of this invention is employed to remove the phase slip from regenerated carrier component.

In FIG. 3, block 2 again denotes a frequency detector, block 3 is a low pass filter, and block 4 is a threshold circuit. The phase slip is detected by elements 2-4 in exactly the same operation as that of the embodiment of FIG. 2. A block 6 is a carrier regeneration circuit for extracting the carrier component from the digital phase modulated wave containing noises, and is employed in almost all prior art systems. The output signal of the carrier regeneration circuit 6, or regenerated carrier component, is represented by V(t) expressed by said equation (1). This signal is divided into two; one is directed to the frequency detector 2 for detecting the phase slip and the other to the delay circuit 7. The delay circuit 7 serves to regulate the time so as to make a coincidence at the subsequent phase shifter 8, between the arrival of pulses from the threshold detector 4 and the occurrence of phase slip in the carrier component.

The said coincidence of time makes it possible to remove the phase slip from the regenerated carrier component V(t) because the output of the delay circuit 7 is delayed by 2π at the phase shifter 8 in response to a positive pulse the threshold circuit 4 as a result of detecting a positive phase slip (advancement of $2\pi$). Conversely, the threshold circuit 4, when detecting a negative phase slip (delay of $2\pi$), gives the phase shifter 8 a negative output pulse to put the output of the delay circuit 7 forward by $2\pi$. Therefore, the phase slip is removed from the carrier component which is put out of the phase shifter 8. Then, the carrier wave free from phase slip is fed to a conventional carrier processor (not shown in the figure) where it is converted into a recovered carrier by such means as frequency dividers, for example.

Figure 3:
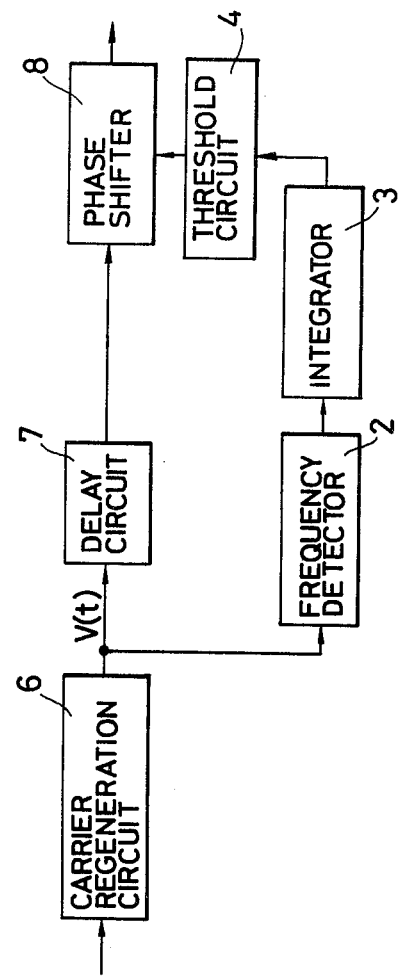
Figure 4:
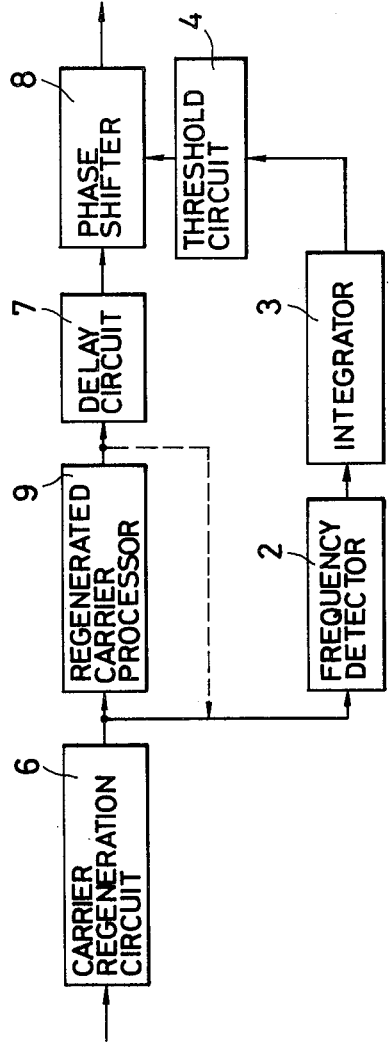

FIG. 4 shows a third embodiment of this invention, where a regenerated carrier processing circuit 9 is provided between the carrier regeneration circuit 6 and the delay circuit 7 of the carrier recovery system of FIG. 3. The regenerated carrier processing circuit 9 is provided for frequency conversion or division of carrier component extracted by the carrier regeneration circuit 6 in order to produce a recovered carrier for use in detection of the digital phase modulated wave.

In a system employing the regenerated carrier processing circuit 9, the amount of the phase shift at the phase shifter 8 is clearly required to be controlled according to the dividing ratio n of the recovered carrier frequency. That is, the regenerated carrier component with frequency fo has a phase slip influence of $2\pi$ advancement or delay at fo, but the recovered carrier with divided frequency fo/n has a phase slip influence of $2\pi/n$. Therefore, in FIG. 4, this should be taken into consideration in determining the amount of phase shift at the phase shifter 8. The other components in FIG. 4 operate in the same way as in the embodiment of FIG. 3.

As is described above, application of the phase slip detector of the first embodiment of this invention to the carrier recovery circuit will make it easy to obtain recovered carrier free from phase slip in both differential and absolute coded coherent PSK systems, and to remove burst error which has been considered comparatively difficult in digital phase modulation systems. It should be noted that, in FIG. 4, the input to the frequency detector 2 can be taken from the output side of the regenerated carrier processing circuit 9, rather than from the input side thereof, as is shown by a chain line.

Figure 5:
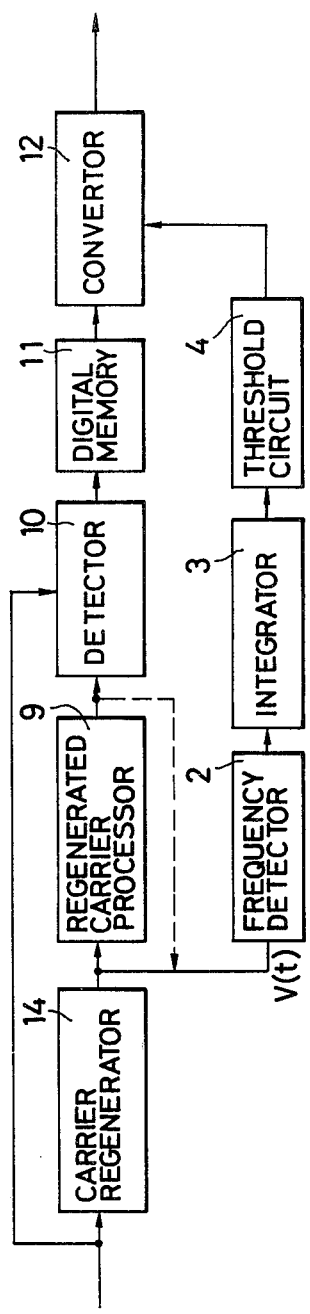

FIG. 5 shows a fourth embodiment of this invention. In the figure, frequency detector 2, low pass filter (integrator) 3 and threshold circuit 4 form the phase slip detector of FIG. 2. Block 14 is a carrier regenerator which receives a digital phase modulated wave containing noise and extracts the regenerated carrier component from the wave. Block 9 is a regenerated carrier processor for converting the output signal of said carrier regenerator 14 into a recovered carrier frequency by means of frequency division, for example. Block 10 is a detector for detecting a digital phase modulated wave of the input signal applied to said carrier regenerator 14 by using the recovered carrier. Block 11 is a digital memory for timing the demodulated data and the output pulses from the threshold circuit 4 in the phase slip detector as well as storing the demodulated data output from the detector 10. Block 12 is a convertor for reversing the polarity of the output data of the digital memory and/or exchanging one datum for another.

Operation of this embodiment will be explained in detail in below. The regenerated carrier component obtained at the output of carrier regenerator 14 is divided into two, one fed to a phase slip detector consisting of frequency detector 2, low pass filter 3 and threshold circuit 4, the other to the regenerated carrier processor 9 which supplies the recovered carrier. At the detector 10, the said recovered carrier is used to detect the digital phase modulated wave and provides demodulated data as its output. This demodulated data is first stored in the digital memory 11, and then read out. If the regenerated carrier component has no phase slip it produces no pulses at the output of the threshold circuit 4, and the demodulated data is read out of memory 11 without any change at the converter 12.

Figure 6:
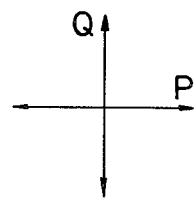
FIG. 6 shows a transmission data sequence.
Figure 7:
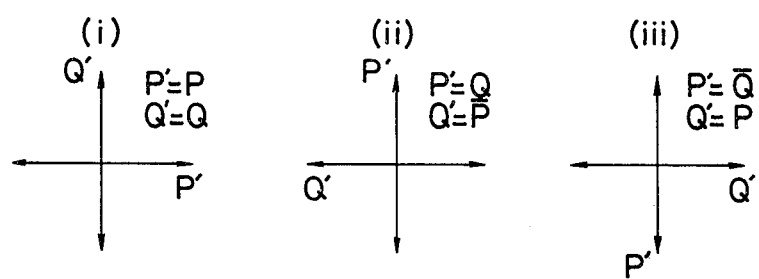
FIG. 7 shows demodulated data sequences.

Next, taking an example of a quaternary PSK wave, operation in the presence of phase slip will be explained with the reference of FIGS. 6 and 7. Under the assumption that the transmission data sequences are represented by P and Q as shown in FIG. 6 and the demodulated data sequences by P' and Q', the relation of these sequences is given in FIG. 7 according to the presence or absence of phase slip. In FIG. 7, (i) shows the demodulated data sequence without phase slip, (ii) shows the sequence in the presence of $2\pi$ advancement phase slip, and (iii) shows the sequence in the presence of $2\pi$ delay phase slip.

As is obvious from FIGS. 6 and 7, in the presence of phase slip of $2\pi$ advancement the demodulated data sequences P' and Q' are replicas of the transmitted data sequences Q and $\bar{P}$. The $\bar{P}$ stands for the reverse polarity of P. Similarly, the demodulated data sequences P' and Q' in the presence of $2\pi$ delay phase slip are equal to $\bar{Q}$ and P. Thus, in the presence of phase slip of regenerated carrier, the demodulated data sequences correspond to the transmitted data sequences with exchanged P and Q either of which is reversed in polarity.

The phase slip produced in the regenerated carrier can be detected by the phase slip detector consisting of the frequency detector 2, the integrator 3 and the threshold circuit 4, so that the occurrence of a positive pulse from threshold circuit 4 ($2\pi$ advancement in phase slip) causes the converter 12 to exchange the demodulated data sequence P' for Q' read out of the digital memory 11, and reverses the polarity of P' after the exchange in order to get correct received data. In the same manner, the converter 12, in response to a negative pulse from threshold circuit 4 ($2\pi$ delay in phase slip), exchanges P' for Q' and reverses the polarity of Q' after the exchange to obtain correct received data.

In the description above, the operation is explained by reference to a quaternary PSK wave, but the system can also be used for other multi-phase PSK waves. Moreover, in the fourth embodiment shown in FIG. 5, the input of frequency detector 2 may taken from the output of regenerated carrier processor 9, rather than from the input thereto, as shown in chain line in the figure.

As is obvious from the explanation above, this embodiment can make a correct compensation of exchange of demodulated data and the reversal of their polarities in response to the phase slip in order to output the correct received data, and may be widely used for the compensation of demodulated data following the detection of a digital PSK wave in various systems including a TDMA system.

What we claim is:
1. A carrier recovery circuit comprising:
   a carrier regeneration circuit for extracting the regenerated carrier component from a digital PSK wave, a frequency detector for detecting the instantaneous value of the output frequency of said carrier regeneration circuit, an integrator for integrating the output signal of said frequency detector, a threshold circuit coupled to said integrator, a phase shifter having an input coupled via delay means to the output of said carrier regeneration circuit whereby said phase shifter receives a delayed output of said carrier regeneration circuit, and means for coupling the output of said threshold circuit to a control terminal of said phase shifter, said phase shifter being operative to shift by a predetermined discrete amount the phase of the input regenerated carrier component in response to the polarity of the integrator output which exceeds a predetermined threshold level set by said threshold circuit.

2. A carrier recovery circuit according to claim 1, including a regenerated carrier processor disposed between the carrier regeneration circuit and said delay means, said regenerated carrier processor being operative to effect frequency conversion or division of the carrier component extracted by the carrier regeneration circuit, one of the input and output of the regenerated carrier processor being coupled to the input of the frequency detector.

3. A demodulated data compensator comprising:

a carrier regeneration circuit for extracting the regenerated carrier component from an input digital PSK wave, a regenerated carrier processor for converting the output of said carrier regeneration circuit into a recovered carrier, a detector for obtaining demodulated data as a result of detection of said input digital PSK wave by using the recovered carrier from said regenerated carrier processor, a memory device coupled to said detector for temporarily storing said demodulated data, a converter coupled to said memory device for reversing the polarity of the data read out of the memory device and/or for exchanging one item of data for another, a frequency detector for detecting the instantaneous value of the frequency of one of said recovered and regenerated carriers, an integrator for integrating the output of said frequency detector, and a threshold circuit coupled to said integrator and having an output which is coupled to said converter, said threshold circuit being operative, when the level of said integrator output exceeds a predetermined threshold level set by said threshold circuit and indicative of the occurrence of phase slip, to control said converter to reverse the polarity of the demodulated data read out of said memory device and/or exchanging items of data from said memory device with one another according to a predetermined rule, thereby compensating an error in said demodulated data caused by the phase slip.

* * * * *